United States Patent
Matsumoto et al.

(10) Patent No.: US 6,329,451 B2
(45) Date of Patent: *Dec. 11, 2001

(54) FLAME RETARDANT PLASTIC RESIN COMPOSITION

(75) Inventors: Kazuaki Matsumoto; Tadashi Koyama; Yoshitaka Ono; Katsutoyo Fujita; Yoichi Ohara; Kazushi Hirobe, all of Osaka (JP)

(73) Assignee: Kaneka Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,114

(22) PCT Filed: Apr. 2, 1997

(86) PCT No.: PCT/JP97/01140

§ 371 Date: Oct. 6, 1998

§ 102(e) Date: Oct. 6, 1998

(87) PCT Pub. No.: WO97/38051

PCT Pub. Date: Oct. 16, 1997

(30) Foreign Application Priority Data

Apr. 8, 1996 (JP) ..................... 8-112014
Aug. 27, 1996 (JP) ..................... 8-245571

(51) Int. Cl.[7] ................................ C08K 3/32
(52) U.S. Cl. ........................... 524/80; 524/414
(58) Field of Search ....................... 524/80, 414

(56) References Cited

U.S. PATENT DOCUMENTS 5,135,971 * 8/1992 Steiert et al. ................... 524/80
5,900,446 * 5/1999 Nishihara et al. ............... 524/127

FOREIGN PATENT DOCUMENTS

| 51-62838 | 5/1976 | (JP) . |
| 6-87606 | 3/1994 | (JP) . |
| 6-145418 | 5/1994 | (JP) . |
| 6-248189 | 9/1994 | (JP) . |
| 8-59977 | 3/1996 | (JP) . |

OTHER PUBLICATIONS

English translation of International Preliminary Examination Report (PCT Form PCT/IB/338 and PCT/IPEA/409) for International Application No. PCT/JP97/01140.

* cited by examiner

Primary Examiner—Kriellion Sanders
(74) Attorney, Agent, or Firm—Armstrong, Westerman, Hattori, McLeland & Naughton, LLP

(57) ABSTRACT

The invention relates to a flame-retardant thermoplastic resin composition having incorporated therein a trace of stabilized red phosphorus, which achieves both improvement of heat resistance and flame retardation without using chlorine nor bromine and also possesses long-term heat stability and smells little. The composition comprises (A) 50 to 95 parts by weight of a polycarbonate resin and (B) 5 to 50 parts by weight of a thermoplastic polyester resin, contains (C) 0.1 to 5 parts by weight, per 100 parts by weight of the total amount of (A) and (B), of coated stabilized red phosphorus and preferably contains (D) 0.1 to 100 parts by weight, per 100 parts by weight of the total amount of (A) and (B), of a silicate compound.

9 Claims, No Drawings ns which are made flame-retardant with red phosphorus include flame-retardant resin compositions comprising a polycarbonate resin and powdered red phosphorus as disclosed in JP-A-48-85642 and JP-A-50-78651.

FLAME RETARDANT PLASTIC RESIN COMPOSITION

TECHNICAL FIELD

This invention relates to a flame-retardant thermoplastic resin composition. More particularly, it relates to a flame-retardant thermoplastic resin composition having incorporated therein a trace of stabilized red phosphorus, which achieves both improvement of heat resistance and flame retardation without using chlorine nor bromine and also possesses long-term heat stability and smells little.

BACKGROUND ART

Polycarbonate resins are thermoplastic resins having excellent impact resistance and heat resistance and widely used as parts in the fields of machinery, automobiles, electricity and electronics. In particular aromatic polycarbonate resins have a high glass transition temperature and are expected to exhibit high heat stability. However, they frequently fail to show sufficient flowability in processing. Therefore, aromatic polycarbonate resins should be processed at relatively high processing temperatures around 300° C. In molding aromatic polycarbonate resins by, for example, injection molding, relatively high injection speed and pressure are required.

On the other hand, thermoplastic polyester resins are excellent in mechanical properties, electrical properties, and chemical resistance and exhibit satisfactory flowability on being heated at or above their crystal melting point and therefore have been used widely as fiber, film and a molding material.

It has been attempted to improve the flowability and the like of polycarbonate resins by taking advantage of these characteristics of the thermoplastic polyester resin. For example, JP-B-36-14035 (the term "JP-B" as used herein means an "examined published Japanese patent application"), JP-B-39-20434, and JP-A-59-176345 (the term "JP-A" as used herein means an "unexamined published Japanese patent application") propose a polycarbonate resin composition containing a polyester resin, such as polyethylene terephthalate, polybutylene terephthalate, etc.

In order to secure safety against fire, thermoplastic resins are often required to have such flame retardance as to meet the standards of UL-94 V-0 or 5V (Underwriter's Laboratories Standard, U.S.A.). Various flame retardants have been developed and studied for this purpose.

Recent environmental concerns growing particularly in Europe have promoted the study on the use of halogen-free flame retardants, such as phosphorus type flame retardants. Useful phosphorus type flame retardants include organic phosphorous compounds and red phosphorus.

Known organic phosphorus compounds include those disclosed in JP-A-63-227632, JP-A-5-1079, and JP-A-5-279513. Compositions which are made flame-retardant by addition of an organic phosphorus flame retardant include the flame-retardant resin composition of JP-A-5-179123, which comprises a polycarbonate resin and other resins and contains an organic phosphorus flame retardant, a boron compound, organopolysiloxane, and a fluororesin, and the flame-retardant resin composition of JP-A-6-192553, which comprises a polycarbonate resin and a polyalkylene terephthalate resin and contains a graft copolymer, an oligomeric organic phosphorus flame retardant, and a fluorinated polyolefin.

Known red phosphorous species include those described in JP-B-54-39200, JP-A-55-10463, and JP-B-5-8125. Compositions which are made flame-retardant with red phosphorus include flame-retardant resin compositions comprising a polycarbonate resin and powdered red phosphorus as disclosed in JP-A-48-85642 and JP-A-50-78651.

Red phosphorus is difficult to handle because for one thing it is a dangerous chemical having a danger of dust explosion and for another it tends to emit smell or gas when processed in high temperature. In order to overcome these problems, various techniques for coating the surface of red phosphorus for stabilization have been proposed. For example, JP-A-52-142751, JP-B-5-18356, and JP-A-5-239260 disclose red phosphorus coated with a thermosetting resin, aluminum hydroxide, etc. or electrolessly plated red phosphorus and thermoplastic resins which are rendered flame-retardant by addition of the thus stabilized red phosphorus.

JP-B-2-37370 proposes a flame-retardant resin composition comprising a polyester resin and thermosetting resin-coated red phosphorus and, if desired, a reinforcing filler. JP-A-5-239260 and JP-A-5-247264 disclose a flame-retardant resin composition comprising a thermoplastic resin such as a polycarbonate alloy, a polyester resin, etc. and electrolessly plated red phosphorus.

In the fields where such flame-retardant resin compositions are used as, for example, electric and electronic parts, simplification of assembly and cost reduction have been desired, and it has been promoted to make parts integral or thinner. Therefore, materials used in these parts are required to show satisfactory flowability in molding and to maintain high heat resistance and high flame retardance.

However, addition of an organic phosphorus flame retardant to a polycarbonate resin in an attempt to impart sufficient flame retardance results in considerable reduction in heat resistance.

Polycarbonate resin compositions containing red phosphorus or stabilized red phosphorus lack long-term heat stability. That is, moldings obtained suffer from deformation when exposed to a temperature no higher than around 150° C. for a long time. Besides, the compositions have poor molding processability because of low flowability. If the compositions are molded at high temperatures to secure flowability, there arise different problems such that a smell attributable to red phosphorus issues during molding and that decomposition gas generates during molding to contaminate the mold.

In addition it is difficult with red phosphorus alone to obtain sufficient flame retardance. It means that red phosphorus should be used either in a large quantity or in combination with another flame retardant or a flame retardation aid. However, addition of a large quantity of red phosphorus leads to a stronger smell attributable to red phosphorus, and a combined use of a flame retardation aid results in not only destruction of the balance of properties of the resin but an increase of cost.

DISCLOSURE OF INVENTION

The inventors have conducted extensive investigation on red phosphorus-containing flame-retardant resin compositions. As a result, they have surprisingly found that improvements in heat resistance and long-term heat stability result when stabilized red phosphorus is added to an alloy comprising a polycarbonate resin and a polyester resin as compared with the alloy containing no stabilized red phosphorus and that this effect is never be observed with other thermoplastic resins. They have ascertained that addition of only a trace amount of stabilized red phosphorus to a polycarbonate resin-polyester resin alloy produces high flame retardance to provide a flame-retardant resin composition that retains the excellent characteristics possessed by the alloy, such as molding processability, non-smelling properties, and the like. They have additionally discovered that addition of a combination of stabilized red phosphorus and a silicate compound brings about further improvements in not only flame retardance but the above-mentioned other properties. The present invention has been reached based on these findings.

The present invention provides in its first aspect a flame-retardant thermoplastic resin composition comprising (A) 50 to 95 parts by weight of a polycarbonate resin, (B) 5 to 50 parts by weight of a thermoplastic polyester resin and (C) 0.1 to 5 parts by weight, per 100 parts by weight of the total of (A) and (B), of coated stabilized red phosphorus.

The present invention provides in its second aspect a flame-retardant thermoplastic resin composition comprising (A) 50 to 95 parts by weight of a polycarbonate resin, (B) 5 to 50 parts by weight of a thermoplastic polyester resin and (C) 0.1 to 5 parts by weight, per 100 parts by weight of the total amount of (A) and (B), of coated stabilized red phosphorus and (D) 0.1 to 100 parts by weight, per 100 parts by weight of the total amount of (A) and (B), of a silicate compound.

The resin composition of the invention can further contain one or more of components (E) to (G) hereinafter described.

In a preferred embodiment of the invention, the flame-retardant thermoplastic resin composition further contains (E) 0.01 to 5 parts by weight of a fluorocarbon resin and/or silicone per 100 parts by weight of the total amount of (A) and (B).

In a preferred embodiment of the invention, the flame-retardant resin composition contains (C) 0.1 to 3 parts by weight of stabilized red phosphorus, (D) 0.1 to 100 parts by weight of a silicate compound, and (E) 0.01 to 5 parts of a fluorocarbon resin and/or silicone, each per 100 parts by weight of the total amount of (A) and (B).

In another preferred embodiment of the invention, the flame-retardant resin composition further contains (F) 0.1 to 30 parts by weight of an organic phosphorus flame retardant per 100 parts by weight of the total amount of (A) and (B).

In still another preferred embodiment of the invention, the flame-retardant resin composition further contains (G) 0.1 to 20 parts by weight of at least one elastic resin selected from graft polymers and olefin resins per 100 parts by weight of the total amount of (A) and (B).

In yet another preferred embodiment of the invention, the thermoplastic polyester resin as component (B) is a polyalkylene terephthalate having not less than 80% by weight of an alkylene terephthalate unit.

In an additional preferred embodiment of the invention, the stabilized red phosphorus flame retardant as component (C) is red phosphorus coated with at least one substance selected from a thermosetting resin, a metal hydroxide, and a plating metal.

Polycarbonate resin (A) used in the present invention is obtained by reacting a di- or polyhydric phenol compound and phosgene or a carbonic diester such as diphenyl carbonate.

There are various dihydric phenols usable. Particularly suitable is 2,2-bis(4-hydroxyphenyl)propane, which is generally called bisphenol A. Dihydric phenols other than bisphenol A include dihydroxydiarylalkanes, such as bis(4-hydroxyphenyl)methane, bis(4-hydroxyphenyl) phenylmethane, bis(4-hydroxyphenyl)naphthylmethane, bis(4-hydroxyphenyl)-(4-isopropylphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)propane, 2,2-bis(3-methyl-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, and 1,1-bis(4-hydroxyphenyl)-3,3,5-trimethylcyclohexane; dihydroxydiarylcycloalkanes, such as 1,1-bis(4-hydroxyphenyl)cyclohexane and 1,1-bis(4-hydroxyphenyl)cyclodecane; dihydroxydiarylsulfones, such as bis(4-hydroxyphenyl)sulfone and bis(3,5-dimethyl-4-hydroxyphenyl)sulfone; dihydroxydiaryl ethers, such as bis(4-hydroxyphenyl) ether and bis(3,5-dimethyl-4-hydroxyphenyl) ether; dihydroxydiaryl ketones, such as 4,4'-dihydroxybenzophenone and 3,3',5,5'-tetramethyl-4,4'-dihydroxybenzophenone; dihydroxydiaryl sulfides, such as bis(4-hydroxyphenyl) sulfide, bis(3-methyl-4-hydroxyphenyl) sulfide, and bis(3,5-dimethyl-4-hydroxyphenyl) sulfide; dihydroxydiaryl sulfoxides, such as bis(4-hydroxyphenyl) sulfoxide; dihydroxydiphenyls, such as 4,4'-dihydroxydiphenyl; and dihydroxyarylfluorenes, such as 9,9-bis(4-hydroxyphenyl)fluorene. In addition to the dihydric phenols, dihydroxybenzenes, such as hydroquinone, resorcinol, and methylhydroquinone; and dihydroxynaphthalenes, such as 1,5-dihydroxynaphthalene and 2,6-dihydroxynaphthalene, are also useful. These dihydric phenols can be used either individually or as a combination of two or more thereof.

Suitable carbonic diester compounds include diaryl carbonates, such as diphenyl carbonate, and dialkyl carbonates, such as dimethyl carbonate and diethyl carbonate.

The polycarbonate resin as component (A) can-contain a branched polycarbonate if desired. Branching agents which can be used for obtaining branched polycarbonates include phloroglucin, mellitic acid, trimellitic acid, trimellitic chloride, trimellitic anhydride, gallic acid, n-propyl gallate, protocatechuic acid, pyromellitic acid, pyromellitic acid dianhydride, α-resorcylic acid, β-resorcylic acid, resorcylaldehyde, isatinbis(o-cresol), benzophenonetetracarboxylic acid, 2,4,4'-trihydroxybenzophenone, 2,2',4,4'-tetrahydroxybenzophenone, 2,4,4'-trihydroxyphenyl ether, 2,2',4,4'-tetrahydroxyphenyl ether, 2,4,4'-trihydroxydiphenyl-2-propane, 2,2'-bis(2,4-dihydroxyphenyl)propane, 2,2',4,4'-tetrahydroxydiphenylmethane, 2,4,4'-trihydroxydiphenylmethane, 1-[α-methyl-α-(4'-dihydroxyphenyl)ethyl]-3-[α', α'-bis(4"-hydroxyphenyl)ethyl]benzene, 1-[α-methyl-α-(4'-dihydroxyphenyl)ethyl]-4-[α'α'-bis(4'-hydroxyphenyl)ethyl]benzene, α,α',α"-tris(4-hydroxyphenyl)-1,3,5-triisopropylbenzene, 2,6-bis(2'-hydroxy-5'-methylbenzyl)-4-methylphenol, 4,6-dimethyl-2,4,6-tris(4'-hydroxyphenyl)-heptene, 4,6-dimethyl-2,4,6-tris(4'-hydroxyphenyl)-heptane, 1,3,5-tris(4'-hydroxyphenyl)benzene, 1,1,1-tris(4-hydroxyphenyl)ethane, 2,2-bis[4,4-bis(4'-hydroxyphenyl)cyclohexyl]propane, 2,6-bis(2'-hydroxy-5'-isopropylbenzyl)-4-isopropylphenol, bis[2-hydroxy-3-(2'-hydroxy-5'-methylbenzyl)-5-methylphenyl]methane, bis

[2-hydroxy-3-(2'-hydroxy-5'-isopropylbenzyl)-5-methylphenyl]methane, tetrakis(4-hydroxyphenyl)methane, tris(4-hydroxyphenyl)phenylmethane, 2',4',7-trihydroxyflavan, 2,4,4-trimethyl-2',4',7-trihydroxyflavan, 1,3-bis(2',4'-dihydroxyphenylisopropyl)benzene, and tris(4'-hydroxyphenyl)-amyl-s-triazine.

In some cases, a polycarbonate-polyorganosiloxane copolymer composed of a polycarbonate segment and an polyorganosiloxane segment can be used as polycarbonate resin (A). The degree of polymerization of the polyorganosiloxane segment is preferably 5 or more.

Additionally, polycarbonate resins comprising a comonomer unit derived from a straight-chain aliphatic dicarboxylic acid, such as adipic acid, pimelic acid, suberic acid, azelaic acid, sebacic acid, and decanedicarboxylic acid, can also be used as component (A).

Various known polymerization terminators can be used in producing the polycarbonate resin. Suitable terminators include monohydric phenols, such as phenol, p-cresol, p-t-butylphenol, p-t-octylphenol, p-cumylphenol, and non-ylphenol.

For the purpose of increasing flame retardance, copolymers comprising a phosphorus compound unit or phosphorus compound-terminated polymers can be used. For improving weather resistance, copolymers comprising a dihydric phenol unit having a benzotriazole group can be used.

Polycarbonate resin (A) which can be used in the present invention preferably has a viscosity average molecular weight of 10000 to 60000, still preferably 15000 to 45000, particularly preferably 18000 to 35000. If the viscosity average molecular weight is less than 10000, the resulting resin composition tends to have insufficient strength or heat resistance. If it exceeds 60000, the composition tends to have insufficient molding processability.

These polycarbonate resins can be used either individually or as a combination of two or more thereof. The combination of the polycarbonate resins is not limited. For example, two or more resins different in monomer unit, copolymerizing molar ratio and/or molecular weight can be combined arbitrarily.

Thermoplastic polyester resin (B) is a resin obtained by polycondensation of a di- or polycarboxylic acid component, a di- or polyhydric alcohol and/or phenol component in a known manner. Examples of useful thermoplastic polyester resins are polyethylene terephthalate, polypropylene terephthalate, polybutylene terephthalate, polyhexamethylene terephthalate, polycyclohexanedimethylene terephthalate, polyethylene naphthalate, and polybutylene naphthalate.

Of the di- or polycarboxylic acid components, aromatic polycarboxylic acid components having 8 to 22 carbon atoms and ester-forming derivatives thereof are used. Examples thereof include phthalic acids, such as terephthalic acid and isophthalic acid; carboxylic acids, such as naphthalenedicarboxylic acid, bis(p-carboxyphenyl)methane, anthracenedicarboxylic acid, 4,41-diphenyldicarboxylic acid, 1,2-bis(phenoxy)ethane-4,4'-dicarboxylic acid, diphenylsulfonedicarboxylic acid, trimesic acid, trimellitic acid, and pyromellitic acid; and ester-forming derivatives thereof. They can be used either individually or as a combination of two or more thereof. Preferred of them are terephthalic acid, isophthalic acid, and naphthalenedicarboxylic acid for their ease of handling and reacting and excellent physical properties of the resulting resin.

Other useful di- or polycarboxylic acid components include aliphatic ones having 4 to 12 carbon atoms, alicyclic ones having 8 to 15 carbon atoms, and ester-forming derivatives thereof. Examples are adipic acid, sebacic acid, azelaic acid, dodecanedicarboxylic acid, maleic acid, 1,3-cyclohexanedicarboxylic acid, and 1,4-cyclohexanedicarboxylic acid, and ester-forming derivatives thereof.

The ester-forming derivatives of the carboxylic acids are derivatives capable of forming an ester, such as carboxylic acid halides (e.g., carboxylic acid chloride) and carboxylic acid esters.

The di- or polyhydric alcohol and/or phenol component includes aliphatic compounds having 2 to 15 carbon atoms, alicyclic compounds having 6 to 20 carbon atoms and aromatic compounds having 6 to 40 carbon atoms, each of which having two or more hydroxyl groups per molecule, and ester-forming derivatives thereof. Examples of such alcoholic and/or phenolic components include ethylene glycol, propylene glycol, butanediol, hexanediol, decanediol, neopentyl glycol, cyclohexanedimethanol, cyclohexanediol, 2,2'-bis(4-hydroxyphenyl)propane, 2,2'-bis(4-hydroxycyclohexyl)propane, hydroquinone, glycerol, and pentaerythritol, and their ester-forming derivatives. Preferred alcohol and/or phenol components are ethylene glycol, butanediol, and cyclohexanedimethanol for their ease of handling and reacting and excellent physical properties of the resulting resin.

Thermoplastic polyester resin (B) may further comprise known copolymerizable component in addition to the above-mentioned acid component and alcohol and/or phenol component as far as the characteristics as desired are not impaired.

Oxyacids, such as p-hydroxybenzoic acid, and their ester-forming derivatives, cyclic esters, such as e-caprolactone, and the like can also be used as a copolymerizable component.

Further, copolymers having copolymerized in the polymeric chain a polyalkylene glycol unit, such as polyethylene glycol, polypropylene glycol, poly(ethylene oxide-propylene oxide) block and/or random copolymers, ethylene oxide-added bisphenol A copolymers, propylene oxide-added bisphenol A copolymers, tetrahydrofuran-added bisphenol A copolymers, and polytetramethylene glycol, can also be used. The proportion of these copolymer unit is generally 20% by weight or less, preferably 15% by weight or less, particularly 10% by weight or less.

It is preferred that thermoplastic polyester resin (B) be a polyalkylene terephthalate, preferably one having an alkylene terephthalate unit content of 80% by weight or more, particularly 85% by weight or more, especially 90% by weight or more. Such a polyalkylene terephthalate provides a resin composition having well-balanced physical properties, such as moldability.

It is preferred for thermoplastic polyester resin (B) to have an intrinsic viscosity (IV) of 0.30 to 2.00 dl/g, still preferably 0.40 to 1.80 dl/g, particularly preferably 0.50 to 1.60 dl/g, as measured in a phenol/tetrachloroethane (1/1 by weight) mixed solvent at 25° C. If the intrinsic viscosity is less than 0.30 dl/g, the resulting moldings tend to have insufficient flame retardance or mechanical strength. If it exceeds 2.00 dl/g, the composition tends to have reduced flowability in molding.

The thermoplastic polyester resins as component (B) can be used either individually or as a combination of two or more thereof. The combination is not limited. For example, two or more resins different in monomer unit, copolymerizing molar ratio and/or molecular weight can be combined arbitrarily.

The mixing ratio of polycarbonate resin (A) and thermoplastic polyester resin (B) is from 95/5 to 50/50, preferably 90/10 to 55/45, still preferably 85/15 to 60/40, by weight. If the weight ratio of thermoplastic polyester resin (B) in the (A)/(B) mixture is less than 5, the resulting resin composition has insufficient molding flowability, and the effect of stabilized red phosphorus in improving long-term heat stability is insubstantial. If it exceeds 50, the impact resistance that is characteristic of polycarbonate resins is reduced.

Stabilized red phosphorus (C) is red phosphorus having been stabilized by surface coating through various methods. Red phosphorus coated with at least one substance selected from a thermosetting resin, a metal hydroxide, and a plating metal is preferred. Any thermosetting resin that can coat red phosphorus can be used without particular limitation. Suitable thermosetting resins include a phenol-formalin resin, a urea-formalin resin, a melamine-formalin resin, and an alkyd resin. Any metal hydroxide that can coat red phosphorus can be used with no particular limitation. Suitable metal hydroxides include aluminum hydroxide, magnesium hydroxide, zinc hydroxide, and titanium hydroxide. Any electrolessly plating film that can coat red phosphorus can be used with no particular limitation. Examples of the plating metals include Fe, Ni, Co, Cu, Zn, Mn, Ti, Zr, Al, and their alloys. Two or more of these coating substances can be used as a mixture or can be provided in different layers.

The coated and stabilized red phosphorus is advantageous for its ease of handling and improved smell.

The stabilized red phosphorus species can be used either individually or as a combination of two or more thereof. The combination is not limited. For example, species different in kind of the coating substance and/or particle size can be combined arbitrarily.

The content of stabilized red phosphorus (C) is 0.1 to 5 parts by weight, preferably 0.3 to 4 parts by weight, still preferably 0.5 to 3 parts by weight, per 100 parts by weight of the total of polycarbonate resin (A) and thermoplastic polyester resin (B). If it is less than 0.1 part, the resulting molded articles have insufficient flame retardance. If it exceeds 5 parts, the resin composition gives off smell vigorously.

It is preferable for the flame-retardant thermoplastic resin composition of the invention to contain a silicate compound as component (D). The existence of a silicate, even in a trace amount, brings about significant improvement in flame retardance. Addition of a silicate compound also leads to improvements in heat resistance and elastic modulus. Useful silicate compounds typically include those containing a chemical composition of an $SiO_2$ unit. While not limiting, the silicate compound usually has a particulate shape, a granular shape, a needle-like shape, a tabular shape, etc. The silicate compound to be used may be either a natural one or a synthetic one.

Specific examples of suitable silicate compounds are magnesium silicate, aluminum silicate, calcium silicate, talc, mica, wollastonite, kaolin, diatomaceous earth, and smectite. Preferred are mica, talc, kaolin and smectite because they are highly effective in not only greatly enhancing flame retardance but suppressing anisotropy of molded articles and improving heat resistance and mechanical strength.

Mica as component (D) is not particularly limited in species. An arbitrary choice can be made from among commonmica (muscovite), phlogopite, sericite, biotite, paragonite, synthetic mica, and the like. The mica can be surface-treated to have improved adhesion to the resin matrix. A silane coupling agent containing an epoxy group, such as epoxysilane, is a preferred surface treating agent; for it will not reduce the physical properties of the resins. The surface treatment can be carried out in a conventional manner with no particular restriction.

It is preferred that the mica to be used has a weight-average flake diameter of 1 to 40 $\mu$m for the reasons that: the effects in flame retardation and prevention of dripping are enhanced; the processability in melt kneading is improved; and the resulting molded articles have improved impact strength. It is still preferred for the mica to have a weight-average flake diameter of 2 to 37 $\mu$m, particularly 3 to 35 $\mu$m. If the weight-average flake diameter is smaller than 1 $\mu$m, the particles are difficult to melt-knead together with resinous components because of their too high bulk specific gravity. If the weight-average flake diameter is greater than 40 $\mu$m, the impact resistance of molded articles and the dripping prevention effect tend to be reduced.

The terminology "weight-average flake diameter" as used herein for mica denotes the size of the opening of a microsieve through which 50% by weight of particles pass in the plots on a Rosin-Rammlar distribution, which is prepared by classifying the particles with microsieves of various opening sizes.

These mica species can be used either individually or as a mixture of two or more thereof different in particle size, kind, surface treating agent, and the like.

In using talc as component (D), it is preferred to use talc having a weight-average particle diameter of 1.0 $\mu$m or more and a bulk specific volume of 8.0 ml/g or less for obtaining enhanced effects of addition in flame retardation and dripping prevention, improved processability in melt kneading, and improved impact strength of molded articles. The weight-average particle diameter is still preferably 1.1 to 30 $\mu$m, particularly 1.2 to 20 $\mu$m. The bulk specific volume is still preferably 7.0 ml/g or less, particularly 6.0 ml/g or less. Talc having a weight-average particle diameter of less than 1.0 $\mu$m or a bulk specific volume exceeding 8.0 ml/g is difficult to melt-knead with resinous components and tends to produce only a poor effect in preventing resin dripping. If the weight-average particle size exceeds 30 $\mu$m, the molded article tends to have reduced impact strength.

The terminology "weight-average particle diameter" as used herein for talc means the size of the opening of a microsieve through which 50% by weight of particles pass when the particles are classified with microsieves of various opening sizes.

The talc to be used in the present invention is chosen appropriately from commercially available products without particular limitation in kind, place of origin, etc. The talc can be surface-treated to have improved adhesion to the resin matrix. A silane coupling agent containing an epoxy group, such as epoxysilane, is a preferred surface treating agent, for it will not reduce the physical properties of the resins. The surface treatment can be carried out in a conventional manner with no particular restriction. These talc species can be used either individually or as a mixture of two or more species different in particle diameter, kind, surface treating agent, etc.

Silicate compound (D) is added in an amount of 0.1 to 100 parts by weight, preferably 0.2 to 70 parts by weight, still preferably 0.3 to 50 parts by weight, per 100 parts by weight of the total amount of polycarbonate resin (A) and aromatic polyester resin (B). Less than 0.1 part by weight of silicate compound (D) tends to produce poor effect in improving flame retardance, heat resistance and mechanical strength of molded articles. More than 100 parts by weight of silicate compound (D) tends to reduce the impact resistance and surface properties of molded articles and to be difficult to melt-knead with the resins.

For the purpose of further improving flame retardance, (E) a fluorocarbon resin and/or silicone can be used in the present invention.

The fluorocarbon resin is a resin containing a fluorine atom and includes polymonofluoroethylene, polydifluoroethylene, polytrifluoroethylene, polytetrafluoroethylene, and a tetrafluoroethylene-hexafluoropropylene copolymer. If desired, copolymers obtained from a monomer which provides the above-described fluorocarbon resin and a copolymerizable monomer can be used in such an amount that will not ruin the physical properties of resulting molded articles such as flame retardance. These fluorocarbon resins can be used either individually or as a combination of two or more thereof.

The fluorine content in the fluorocarbon resin is preferably such that corresponds to polymono- to tetrafluoroethylene. Polytetrafluoroethylene is preferred the most of the fluorocarbon resins.

The fluorocarbon resin preferably has a molecular weight of 1,000,000 to 20,000,000, particularly 2,000,000 to 10,000,000. The fluorocarbon resin can be prepared by customary methods, such as emulsion polymerization, suspension polymerization, bulk polymerization, and solution polymerization.

The silicone is an organosiloxane, including siloxane compounds, e.g., dimethylsiloxane and phenylmethylsiloxane, and polyorganosiloxanes obtained by homo- or copolymerizing the siloxane compounds, such as dimethyl polysiloxane, phenylmethyl polysiloxane. The polyorganosiloxane may be modified silicone having its molecular end substituted with an epoxy group, a hydroxyl group, a carboxyl group, a mercapto group, an amino group, an ether group, etc.

Inter alia, polymers having a number average molecular weight of 200 or higher, particularly 1,000 to 5,000,000, are preferred for their effect in improving flame retardance. The silicone is not particularly limited in form and can have any of an oil form, a rubber form, a varnish form, a powder form, a pellet form, etc.

Fluorocarbon resin and/or silicone (E) is/are added in an amount of 0.01 to 5 parts by weight, preferably 0.03 to 4 parts by weight, still preferably 0.05 to 3.5 parts by weight, per 100 parts by weight of the total amount of polycarbonate resin (A) and thermoplastic polyester resin (B). If the amount is less than 0.01 part, the effect in improving flame retardance is small. If it exceeds 5 parts, the moldability is reduced.

Where silicate compound (D) and fluorocarbon resin and/or silicone (E) are added in combination, there is produced an increased flame retardation effect so that satisfactory flame retardance can be obtained even with the amount of stabilized red phosphorus (C) being as small as 0.1 to 3 parts by weight. As a result, the smell on molding is further weakened, and the cost of production is reduced. The amount of stabilized red phosphorus (C) to be added is preferably 0.2 to 2.8 parts by weight, still preferably 0.3 to 2.5 parts.

In the present invention, the flame retardance and molding processability can further be improved by adding (F) an organic phosphorus flame retardant according to the end use and purpose. Useful organic phosphorus flame retardants include phosphates, phosphonates, phosphinates, phosphine oxides, phosphites, phosphonites, phosphinites and phosphines. Specific examples are trimethyl phosphate, triethyl phosphate, tributyl phosphate, tri(2-ethylhexyl) phosphate, tributoxyethyl phosphate, triphenyl phosphate, tricresyl phosphate, trixylenyl phosphate, tris(isopropylphenyl) phosphate, tris(phenylphenyl) phosphate, trinaphthyl phosphate, cresyldiphenyl phosphate, xylenyldiphenyl phosphate, diphenyl(2-ethylhexyl) phosphate, di(isopropylphenyl)phenyl phosphate, phenyldicresyl phosphate, di-2-ethylhexyl phosphate, monoisodecyl phosphate, 2-acryloyloxyethyl acid phosphate, 2-methacryloylxyethyl acid phosphate, diphenyl-2-acryloyloxyethyl phosphate, diphenyl-2-methacryloyloxyethyl phosphate, triphenyl phosphite, tris-nonylphenyl phosphite, tristridecyl phosphite, dibutyl hydrogenphosphite, triphenylphosphine oxide, tricresylphosphine oxide, diphenyl methanephosphonate, and diethyl phenylphosphonate.

In particular, phosphoric esters represented by formula:

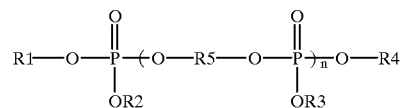

wherein $R^1$, $R^2$, $R^3$, and $R^4$ each represent a monovalent aromatic or aliphatic group; $R^5$ represents a divalent aromatic group; n represents a number of from 0 to 16; $nR^3$'s and $nR^5$'s may be the same or different, respectively, are preferred for their excellent flame retardation effect and ease of handling. Condensed phosphoric esters of the above formula, in which n is 1 to 16, are still preferred; for they cause less contamination of the metallic part of a mold.

Examples of the phosphoric esters of the above formula wherein n is 0 are triphenyl phosphate, tricresyl phosphate, trixylenyl phosphate, cresyldiphenyl phosphate, and xylenyldiphenyl phosphate.

Examples of the condensed phosphoric esters of the above formula are shown below.

(1) Resorcinolbis(diphenyl) phosphate

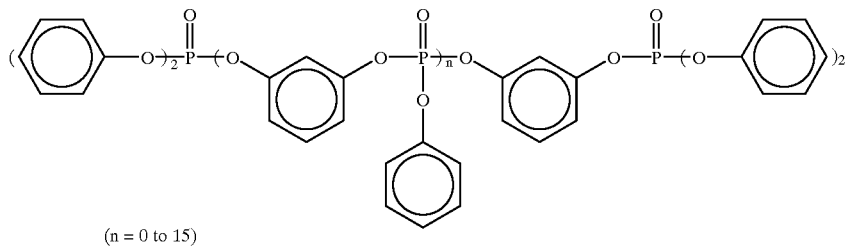

(n = 0 to 15)

(2) Resorcinolbis(di-2,6-xylyl) phosphate

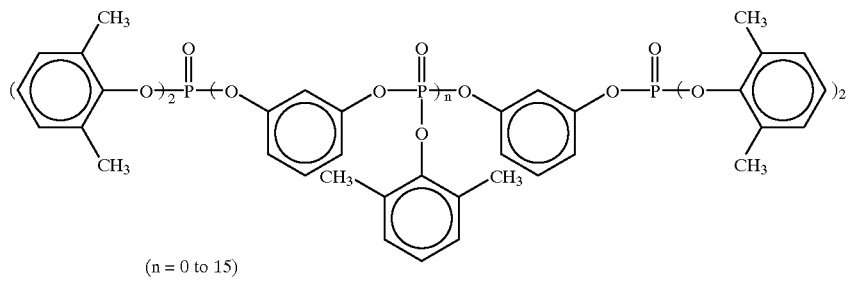

(n = 0 to 15)

(3) Bisphenol A bis(dicresyl) phosphate

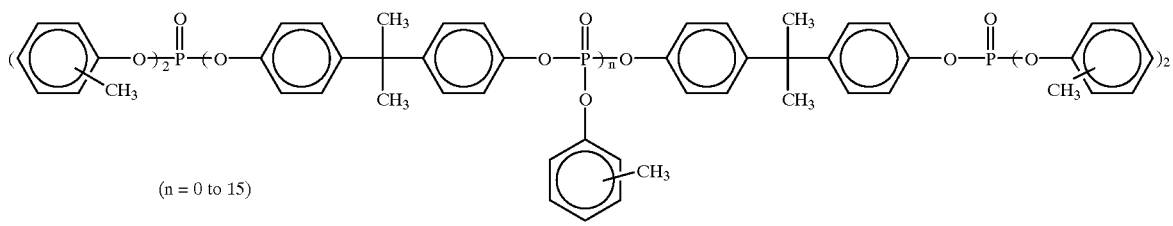

(n = 0 to 15)

(4) Hydroquinonebis(di-2,6-xylyl) phosphate

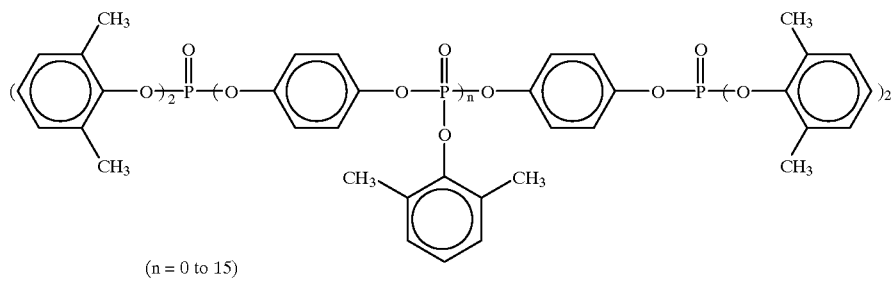

(n = 0 to 15)

(5) Condensates comprising these phosphates.

These organic phosphorus flame retardants can be used either individually or as a combination of two or more thereof.

Organic phosphorus flame retardant (F) is added in an amount of 0.1 to 30 parts by weight, preferably 0.2 to 25 parts by weight, still preferably 0.3 to 20 parts by weight, per 100 parts by weight of the total amount of polycarbonate resin (A) and aromatic polyester resin (B). If the amount of organic phosphorus flame retardant (F) is less than 0.1 part by weight, the effects in improving flame retardance and molding processability are poor. If it exceeds 30 parts by weight, the resulting molded articles tend to have reduced impact resistance, heat resistance or solvent resistance.

In order to improve the impact strength, toughness, chemical resistance and the like of the molded articles, it is preferable-to add (G) one or more elastic resins selected from graft polymers and olefin resins. Elastic resins having at least one glass transition point at or below 0° C., particularly −20° C. or lower, are preferred for improving the impact strength.

Of elastic resins (G) the graft rubber is one comprising a rubber-like elastomer to which a vinyl monomer is graft-copolymerized.

The rubber-like elastomers include diene rubbers, such as polybutadiene, styrene-butadiene rubber, acrylonitrile-butadiene rubber, and alkyl (meth)acrylate-butadiene rubber, acrylic rubber, ethylene-propylene rubber, and siloxane rubber.

The vinyl monomer includes aromatic vinyl compounds, vinyl cyanide compounds, alkyl (meth)acrylates, and other vinyl compounds capable of being grafted to rubber-like elastomers.

The aromatic vinyl compounds include styrene, o-methylstyrene, m-methylstyrene, p-methylstyrene, α-methylstyrene, and vinyltoluene.

The vinyl cyanide compounds include acrylonitrile and methacrylonitrile.

The alkyl (meth)acrylates include butyl acrylate, butyl methacrylate, ethyl acrylate, ethyl methacrylate, methyl acrylate, and methyl methacrylate.

The other vinyl compounds include unsaturated acids, such as acrylic acid and methacrylic acid; glycidyl (meth) acrylates, such as glycidyl acrylate and glycidyl methacrylate; vinyl acetate, maleic anhydride, and N-phenylmaleimide.

The copolymerizing ratio of the rubber-like elastomer and the vinyl compound is not particularly limited. A preferred ratio for securing improvement in impact strength is 10/90 to 90/10, particularly 30/70 to 80/20, by weight. If the weight ratio of the rubber-like elastomer is less than 10, the effect in improving impact resistance is lessened. If it exceeds 90, the graft rubber tends to have reduced compatibility to resins (A) and (B).

Of elastic resin (G), the term "olefin resin" is used herein in its inclusive sense and is intended to include not only polyolefins in its narrow sense but also polydienes, mixtures of two or more of the polyolefins and polydienes, copolymers comprising an olefin monomer and two or more diene monomers, copolymers comprising an olefin monomer and at least one vinyl monomer copolymerizable with an olefin, and the like. Examples of the olefin resins are homo- or copolymers comprising one or more monomers selected from ethylene, propylene, 1-butene, 1-pentene, isobutene, butadiene, isoprene, phenylpropadiene, cyclopentadiene, 1,5-norbornadiene, 1,3-cyclohexadiene, 1,4-cyclohexadiene, 1,5-cyclooctadiene, 1,3-cyclooctadiene, α,ω-nonconjugated diene, etc.; and mixtures of two or more of these homopolymers and copolymers. Preferred among them are polyethylene and polypropylene from the standpoint of improvement in chemical resistance of the resulting composition.

Copolymers comprising the above-described olefin component and a vinyl monomer copolymerizable with the olefin, such as (meth)acrylic acid, an alkyl (meth)acrylate, glycidyl (meth)acrylate, vinyl acetate, maleic anhydride, N-phenylmaleimide, and carbon monoxide, are also useful. Examples of such copolymers are an ethylene-ethyl acrylate copolymer, an ethylene-butyl acrylate-carbon monoxide terpolymer, an ethylene-glycidyl methacrylate copolymer, an ethylene-glycidyl methacrylate-vinyl acetate copolymer, an ethylene-vinyl acetate copolymer, an ethylene-vinyl acetate-carbon monoxide copolymer, an ethylene-acrylic acid copolymer, an ethylene-maleic anhydride copolymer, and an ethylene-maleic anhydride-N-phenylmaleimide copolymer.

These polyolefin resins can be obtained by various polymerization techniques with no particular restriction. As for polyethylene, for instance, high-density polyethylene, medium-density polyethylene, low-density polyethylene, linear low-density polyethylene, and the like are produced depending on the polymerization process, any of them can be used for preference.

When the graft polymer and the olefin resin are used in combination as component (G), the above-mentioned various effects are enhanced.

The amount of elastic resin (G) to be added is preferably 0.1 to 20 parts by weight, still preferably 0.1 to 15 parts by weight, particularly preferably 0.2 to 12 parts by weight, per 100 parts by weight of the total amount of polycarbonate resin (A) and thermoplastic polyester resin (B). If it exceeds 20 parts, rigidity and heat resistance are reduced.

In order to further improve the heat resistance and mechanical strength of the resin, a reinforcing filler other than silicate compound (D) can be used either individually or in combination with component (D). Suitable inorganic reinforcing fillers include fibrous reinforcements, such as glass fiber, carbon fiber, and metal fiber; calcium carbonate, glass beads, glass powder, ceramic powder, metal powder, and carbon black. They may be surface-treated to have increased adhesion to the resin matrix. A silane coupling agent containing an epoxy group, such as epoxysilane, is a preferred surface treating agent, which will not reduce the physical properties of the resins. The surface treatment can be carried out in a conventional manner with no particular restriction.

Two or more reinforcing fillers different in kind, particle diameter or length, manner of surface treatment, and the like can be used in combination.

The amount of the inorganic reinforcing fillers to be added is not more than 100 parts by weight, preferably not more then 50 parts by weight, still preferably 10 parts by weight or less, per 100 parts by weight of the total amount of polycarbonate resin (A) and aromatic polyester resin (B). Addition of more than 100 parts by weight not only results in reduction of impact resistance but tends to reduce molding processability and flame retardance. Moreover, as the amount of the inorganic reinforcing filler increases, there is a tendency to deterioration in surface properties and dimensional stability of the resulting molded articles. Where weight is put on these properties, it is preferred to minimize the amount of the inorganic reinforcing filler.

As long as the effects of the invention are not impaired, the flame-retardant resin composition according to the present invention can contain arbitrarily selected additional thermoplastic or thermosetting resins, for example, liquid crystal polyester resins, polyester ester elastomeric resins, polyester ether elastomeric resins, polyolefin resins, polyamide resins, polystyrene resins, polyphenylene sulfide resins, polyphenylene ether resins, polyacetal resins, and polysulfone resins, used either individually or as a combination of two or more thereof. In order to further improve the performance of the flame-retardant resin composition of the invention, it is preferred to use antioxidants (e.g., phenol antioxidants and thioether antioxidants), heat stabilizers (e.g., phosphorus type stabilizers), and the like either individually or as a mixture of two or more thereof. If desired, the resin composition can contain one or more of other well-known additives, such as stabilizers, lubricants, parting agents, plasticizers, flame retardants other than phosphorus type compounds, flame retardation aids, ultraviolet absorbers, light stabilizers, pigments, dyes, antistatic agents, electric conductivity imparting agents, dispersants, compatibilizers, antimicrobials, and so on.

The method for preparing the flame-retardant resin composition of the invention is not particularly limited. For example, the composition is prepared by drying the above-mentioned components and additives, resins, etc. and melt-kneading them in a melt-kneading machine, such as a single- or twin-screw extruder. Where a compounding ingredient is liquid, it can be added to the barrel of a twin-screw extruder by means of a liquid feed pump.

The method for molding the thermoplastic resin composition prepared in the present invention is not particularly limited. Molding methods customarily employed for thermoplastic resins, such as injection molding, blow molding, extrusion molding, vacuum forming, press molding, calendering, expansion molding, and the like, can be applied.

The flame-retardant thermoplastic resin composition of the invention is suited to a variety of uses. Preferred uses include interior and exterior parts of appliances and office automation equipment, injection molded parts of automobiles, blow molded articles, extruded articles, expansion molded articles, etc.

BEST MODE FOR CARRYING OUT INVENTION

The present invention will now be illustrated in greater detail by way of Examples, but it should be understood that the present invention is not limited thereto. Unless otherwise noted, all the parts and percents are given by weight.

Evaluations of resin compositions were made in accordance with the following methods.

Methods of Evaluation:

After the pellets obtained were dried at 120° C. for 4 hours, the dried pellets were injection molded by means of a 35t injection molding machine at a cylinder temperature of 280° C. and a mold temperature of 70° C. to prepare a bar of 12 mm in width, 127 mm in length and 1.6 mm, 2.5 mm or 6.4 mm in thickness and a plate of 150 mm×150 mm×2.5 mm (t).

1) Flame Retardance (1.6 mm thickness)

The flame retardance of the 1.6 mm thick bar was rated on UL-94V Standard. An evaluation was done by judging at which of levels V-2, V-1 and V-0 the flame retardance was.

2) Flame Retardance (2.5 mm thickness)

The flame retardance of the 2.5 mm thick bar was rated on UL-94V Standard. An evaluation was done by judging at which of levels V-2, V-1 and V-0 the flame retardance was. Further, a 2.5 mm thick bar and a 2.5 mm thick plate were prepared from those resin compositions which were rated at V-0 in the above evaluation, and it was judged whether flame retardance was rated at 5VA or 5VB.

3) Heat Resistance

Heat resistance was evaluated by measuring a deflection temperature under load on a 6.4 mm thick bar in accordance with ASTM D-648 under a load of 0.45 MPa.

4) Long-term Heat Stability

A 6.4 mm thick bar was treated at 150° C. for 150 hours. Before and after the heat treatment, a flexural strength was measured in accordance with ASTM D-790. A flexural strength retention (%) was calculated from formula:

(Strength after treatment at 150° C.)/(Strength before treatment)×100

Some samples having poor heat resistance underwent considerable deformation on heat treating at 150° C. so that the flexural strength was unmeasurable, which are indicated by - (hyphen) in Table 1.

5) Smell

After being dried at 120° C. for 4 hours, the pellets were purged from the cylinder of a 75t injection molding machine at a cylinder temperature of 300° C. The smell emitted then was evaluated organoleptically and graded as follows.

A . . . No smell

B . . . Little smell

C . . . Slight smell

D . . . Considerable smell

6) Flowability

After the pellets were dried at 120° C. for 4 hours, a melt index (MI) was measured in accordance with JIS K6730 at 280° C. under a load of 2160 g to evaluate the flowability.

EXAMPLE 1

Seventy-five parts of a bisphenol A type polycarbonate resin (A1) having a viscosity average molecular weight of about 22000, 25 parts of a polyethylene terephthalate resin (B1) having an intrinsic viscosity of about 0.75 dl/g, 4 parts of Nova Excel 140 (C1) (a trade name of phenol resin-coated red phosphorus, produced by Rin Kagaku Kogyo K.K.), and 0.3 part of Adeca Stab HP-10 (a trade name of a phosphite type stabilizer, produced by Asahi Denka Kogyo K.K.) were previously dry blended. The blend was fed to the hopper of a vented twin-screw extruder with its cylinder temperature set at 280° C. (TEX 44, manufactured by The Japan Steel Works, Ltd.) and melt-extruded to obtain a resin compound. The results of evaluations on the resulting resin composition are shown in Table 1.

EXAMPLES 2 TO 26

Resin compositions were prepared in the same manner as in Example 1, except for changing the compounding ingredients as shown in Tables 1 and 2. When the total amount of silicate compound(s) (D) exceeded 10 parts, component (D) was added through the side feed opening of the extruder. Of organic phosphorus flame retardants (F), those which are liquid at room temperature were fed to the cylinder barrel by means of a liquid feed pump. The compounding ingredients used were as follows. The results of evaluations are shown in Tables 1 and 2.

(A) Polycarbonate Resin (A2) Bisphenol A type polycarbonate resin having a viscosity average molecular weight of about 28800.

(B) Thermoplastic Polyester Resin (B2) Polyethylene terephthalate resin having an intrinsic viscosity of 0.6 dl/g.

(B3) Polybutylene terephthalate resin having an intrinsic viscosity of 0.85 dl/g.

(C) Stabilized Red Phosphorus (C2) Stabilized red phosphorus having an average particle diameter of 20 μm, having been coated with 10% of aluminum hydroxide.

(D) Silicate Compound (D1) Mica (A-21S, a trade name, produced by Yamaguchi Unmo K.K.)

(D2) Talc (Microace K-1, a trade name, produced by Nippon talc K.K.)

(E) Fluorocarbon resin and/or Silicone (E1) Polytetrafluoroethylene (Polyfureon FA-500, a trade name, produced by Daikin Industries, Ltd.)

(E2) Silicone (Si Powder DC4-7051, a trade name, produced by Toray Dow Corning Silicone Co., Ltd.)

(F) Organic Phosphorus Flame Retardant (F1) Triphenyl phosphate (F2) Bisphenol A bis(dicresyl) phosphate (F3) Resorcinolbis(di-2,6-xylyl) phosphate
(F4) Hydroquinonebis(di-2,6-xylyl) phosphate
(F5) Resorcinolbis(diphenyl) phosphate
(G) Elastic Resin (selected from graft polymers and olefin resins)
(G1) MBS resin (Kane Ace M-511, a trade name, produced by Kanegafuchi Chemical Industry Co., Ltd.)
(G2) Linear low-density polyethylene (LLDPE) (Idemitsu Polyethylene-L 0134N, a trade name, produced by Idemitsu Petrochemical Co., Ltd.)
(G3) Ethylene-ethyl acrylate copolymer (Evaflex EEA A-713, a trade name, produced by Du Pont-Mitui Polychemicals Co., Ltd.)
Other Additives
Glass fiber (T-195H/PS, a trade name, produced by Nippon Electric Glass Co., Ltd.)

COMPARATIVE EXAMPLES 1 TO 9

Resin compositions were prepared in the same manner as in Example 1, except for changing the compounding ingredients as shown in Table 3 below. The results of evaluations are also shown in Table 3.

The following resins were used as comparative resins other than the polycarbonate resins and polyester resins.
PPE Resin: Poly(2,6-dimethyl-1,4-phenylene)ether resin having a limiting viscosity number of 0.50 as measured in chloroform at 30° C.

HIPS Resin: Rubber-modified high impact polystyrene (Estyrene HI H-65, a trade name, produced by Nippon Steel Chemical Co., Ltd.)

Red Phosphorus: Untreated red phosphorus (reagent) was used for comparison with stabilized red phosphorus.

TABLE 1

| | Example No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Resin Composition | | | | | | | | | | | | | | | |
| A | | | | | | | | | | | | | | | |
| PC (A1) | 75 | 75 | 75 | 75 | 75 | 85 | 75 | 75 | 75 | 60 | 80 | 80 | | 75 | 80 |
| PC (A2) | | | | | | | | | | | | | 75 | | |
| B | | | | | | | | | | | | | | | |
| PET (B1) | 25 | | 25 | 25 | 25 | 15 | 25 | 25 | 25 | 40 | 20 | 20 | | 25 | 20 |
| PET (B2) | | | | | | | | | | | | | 25 | | |
| PBT (B3) | | 25 | | | | | | | | | | | | | |
| C | | | | | | | | | | | | | | | |
| Stabilized red P (C1) | 4.0 | 5.0 | 0.7 | 3.0 | 0.7 | 0.4 | 0.7 | | 0.6 | 1.0 | 0.5 | 2.0 | 1.5 | 0.3 | 0.2 |
| Stabilized red P (C2) | | | | | | | | 1.0 | | | | | | | |
| D | | | | | | | | | | | | | | | |
| Mica (D1) | | | 3.0 | 15 | | 3.0 | 3.0 | 3.0 | | | 10 | 0 | 5 | 15 | 15 |
| Talc (D2) | | | | | | | | | 3.0 | 15 | 5 | | 5 | | |
| E | | | | | | | | | | | | | | | |
| PTFE (E1) | | | | | 0.1 | 0.3 | 0.3 | 0.3 | 0.3 | 0.1 | 0.3 | | 0.5 | 0.8 | 0.5 |
| Silicone (E2) | | | | | | | | | | | | 1.0 | | | |
| G | | | | | | | | | | | | | | | |
| MBS (G1) | | | | | | | 1 | 1 | 1 | | | 0.5 | | | |
| LLDPE (G2) | | | | | | | | | | | | | | | |
| EEA (G3) | | | | | | | 3 | 3 | 3 | 2 | | | | | |
| Others | | | | | | | | | | | | | | | |
| Glass fiber | | | | | | | | | | | | 5 | 5 | | |
| HP-10 (stabilizer) | 0.3 | 0.3 | 0.3 | 0.3 | 0.3 | 0.3 | 0.3 | 0.3 | 0.3 | 0.3 | 0.3 | 0.3 | 0.3 | 0.5 | 0.5 |
| Flame retardance at 1.6 mm (t) (UL-94) | V-0 | V-0 | V-0 | V-0 | V-0 | V-0 | V-0 | V-0 | V-0 | V-0 | V-0 | V-0 | V-0 | V-0 | V-1 |
| Flame retardance at 2.5 mm (t) (UL-94) | V-0 | V-0 | V-0 | V-0 | V-0 | 5VB | 5VB | 5VB | 5VB | 5VA | 5VA | 5VA | 5VA | 5VA | V-0 |
| Heat resistance (° C.) | 144 | 130 | 139 | 145 | 139 | 138 | 135 | 137 | 138 | 145 | 146 | 147 | 145 | 145 | 147 |
| Long-term heat stability (%) | 118 | 102 | 108 | 120 | 108 | 105 | 106 | 107 | 102 | 117 | 120 | 120 | 110 | 118 | 110 |
| Flowability (g/10 min) | 15 | 15 | 14 | 8 | 14 | 11 | 11 | 12 | 14 | 9 | 7 | 7 | 7 | 8 | 6 |
| Smell | B | B | A | A | A | A | A | A | A | A | A | A | A | A | A |

TABLE 2

| | Example No. | | | | | | | | | | |
|---|---|---|---|---|---|---|---|---|---|---|---|
| | 16 | 17 | 18 | 19 | 20 | 21 | 22 | 23 | 24 | 25 | 26 |
| Resin Composition | | | | | | | | | | | |
| A | | | | | | | | | | | |
| PC (A1) | 90 | | 85 | 90 | 80 | | 90 | | 90 | 80 | |
| PC (A2) | | 85 | | | | 70 | | 85 | | | 75 |
| B | | | | | | | | | | | |
| PET (B1) | 10 | | | 10 | 20 | | 10 | 15 | 10 | 20 | |
| PET (B2) | | 15 | | | | 30 | | | | | 25 |
| PBT (B3) | | | 15 | | | | | | | | |
| C | | | | | | | | | | | |
| Stabilized red P (C1) | 1 | 1 | 0.8 | 1 | 1.5 | 2.5 | 1 | 1 | 0.6 | 1 | 1.5 |
| D | | | | | | | | | | | |
| Mica (D1) | | 3.0 | 3.0 | 3.0 | 3.0 | 3.0 | 3.0 | 3.0 | 15 | 10 | 10 |
| Talc (D2) | | | | | | | | | | | 5 |
| E | | | | | | | | | | | |
| PTFE (E1) | | 0.5 | 0.5 | 0.5 | 0.5 | 0.5 | 0.5 | 0.2 | 0.5 | 0.5 | 0.2 |
| F | | | | | | | | | | | |
| Phosphorus compound (F1) | 6 | | | | | | | | | | |
| Phosphorus compound (F2) | | | 5 | 4 | | | 4 | 6 | 5 | 5 | 7 |
| Phosphorus compound (F3) | | 6 | | | | | | | | | |
| Phosphorus compound (F4) | | | | | 4 | | | | | | |
| Phosphorus compound (F5) | | | | | | 6 | | | | | |
| Others | | | | | | | | | | | |
| HP-10 (stabilizer) | 0.2 | 0.2 | 0.2 | 0.2 | 0.2 | 0.2 | 0.2 | 0.2 | 0.2 | 0.2 | 0.2 |
| Flame retardance at 1.6 mm (t) (UL-94) | V-0 | V-0 | V-0 | V-0 | V-0 | V-0 | V-0 | V-0 | V-0 | V-0 | V-0 |
| Flame retardance at 2.5 mm (t) (UL-94) | V-0 | 5VB | 5VB | 5VB | 5VB | 5VB | 5VB | 5VB | 5VA | 5VA | 5VA |
| Heat resistance (° C.) | 118 | 121 | 123 | 122 | 121 | 119 | 120 | 118 | 133 | 133 | 131 |
| Long-term heat stability (%) | 85 | 99 | 95 | 91 | 99 | 93 | 92 | 94 | 98 | 106 | 103 |
| Flowability (g/10 min) | 18 | 18 | 19 | 17 | 20 | 23 | 18 | 19 | 10 | 14 | 13 |
| Smell | A | A | A | A | A | A | A | A | A | A | A |

TABLE 3

| | Comparative Example No. | | | | | | | | | Ref. |
|---|---|---|---|---|---|---|---|---|---|---|
| | 1 | 2 | 3* | 4 | 5 | 6 | 7 | 8 | 9 | Ex. 1 |
| Resin Composition | | | | | | | | | | |
| A | | | | | | | | | | |
| PC (A1) | 100 | 100 | | 75 | 75 | 60 | 75 | 70 | | |
| B | | | | | | | | | | |
| PET (B1) | | | 100 | 25 | 25 | 40 | 25 | 30 | | |
| Other resins | | | | | | | | | | |
| PPE | | | | | | | | | 25 | 25 |
| HIPS | | | | | | | | | 75 | 75 |
| C | | | | | | | | | | |
| Stabilized red P (C1) | 4.0 | 2.0 | 5.0 | 15.0 | | | | 6.0 | | |
| Untreated red P | | | | | | | 0.6 | | | |
| D | | | | | | | | | | |
| Talc (D2) | | | | | | | 15 | 3.0 | | |
| E | | | | | | | | | | |
| PTFE (E1) | | 0.1 | 0.1 | 0.1 | 0.1 | 0.1 | 0.1 | 0.3 | 0.2 | 0.2 |

TABLE 3-continued

|  | Comparative Example No. | | | | | | | | | Ref. |
|---|---|---|---|---|---|---|---|---|---|---|
|  | 1 | 2 | 3* | 4 | 5 | 6 | 7 | 8 | 9 | Ex. 1 |
| F | | | | | | | | | | |
| Phosphorus compound (F5) | | | | | | | | 5.5 | | |
| G | | | | | | | | | | |
| MBS (G1) | | | | | | | | 1 | 5 | |
| EEA (G3) | | | | | | | 2 | 3 | | |
| Others | | | | | | | | | | |
| Stabilizer (HP-10) | 0.3 | 0.3 | | 0.3 | 0.3 | 0.3 | 0.3 | 0.3 | | |
| Glass fiber | | | 50 | | | | | | | |
| Flame retardance at 1.6 mm (t) (UL-94) | V–0 | V–0 | V–1 | V–0 | not V** | not V | V–0 | V–0 | not V | not V |
| Flame retardance at 2.5 mm (t) (UL-94) | V–0 | V–0 | V–1 | 5VA | not V | not V | V–0 | V–0 | V–0 | V–0 |
| Heat resistance (° C.) | 136 | 135 | 220 | 140 | 135 | 138 | 137 | 110 | 105 | 108 |
| Long-term heat stability (%) | — | — | 100 | 113 | 95 | 93 | 98 | — | — | — |
| Flowability (g/10 min) | 5 | 4 | 8 | 10 | 15 | 7 | 14 | 22 | 15 | 18 |
| Smell | B | A | B | D | A | A | D | B | D | A |

Note:
*Only the specimens of Comparative Example 3 were prepared at a mold temperature of 130° C.
***"not V" in the "flame retardance" means out of the specifications of UL 94 V Standard.

Containing no polyester resin, Comparative Examples 1 and 2 have poor flowability and enjoy no improvements in long-term heat stability and heat resistance even with addition of red phosphorus. Comparative Example 3, which contains no polycarbonate resin, is inferior in flame retardance. Comparative Example 4 gives off smell on account of the presence of a large amount of stabilized red phosphorus. Comparative Examples 5 and 6 have poor flame retardance in the absence of stabilized red phosphorus. Besides, Comparative Examples 5 and 6 are inferior to Examples 5 and 10, respectively, in heat resistance and long-term heat stability. Comparative Example 7 produces smell because of the use of non-stabilized red phosphorus. Only using the organic phosphorus flame retardant, Comparative Example 8 exhibits poor heat resistance and poor long-term heat stability. Compared with Reference Example 1, Comparative Example 9 shows no improvements in flame retardance, heat resistance, and long-term heat stability in spite of the addition of stabilized red phosphorus. This proves that the effects of stabilized red phosphorus on these characteristics can never be manifested except when added to specific resins.

As is clear from the foregoing, it is seen that all the compositions according to the present invention are excellent in heat resistance, long-term heat stability, flame retardance and freedom from smell as well as flowability in molding. It is also seen that these effects cannot be obtained when stabilized red phosphorus is added to resins other than those specified in the present invention.

Industrial Applicability

The present invention provides a flame-retardant resin composition exhibiting excellent characteristics in flowability in molding, heat resistance, long-term heat stability, flame retardance, and smell, which are of great use in industry.

What is claimed is:

1. A flame-retardant thermoplastic resin composition comprising (A) 50 to 95 parts by weight of a polycarbonate resin, (B) 5 to 50 parts by weight of a thermoplastic polyester resin, and (C) 0.1 to 5 parts by weight, per 100 parts by weight of the total amount of (A) and (B), of coated stabilized red phosphorus.

2. A flame-retardant thermoplastic resin composition according to claim 1, wherein the composition further contains (D) 0.1 to 100 parts by weight of a silicate compound per 100 parts by weight of the total amount of (A) and (B).

3. A flame-retardant thermoplastic resin composition according to claim 1, wherein the composition further contains (E) 0.01 to 5 parts by weight of a fluorocarbon resin and/or silicone per 100 parts by weight of the total amount of (A) and (B).

4. A flame-retardant thermoplastic resin composition according to any one of claims 1 to 3, wherein the coated stabilized red phosphorus (C) is present in an amount of 0.1 to 3 parts by weight, the silicate compound (D) is present in an amount of 0.1 to 100 parts by weight, and the fluorocarbon resin and/or silicone (E) is present in an amount of 0.01 to 5 parts by weight.

5. A flame-retardant thermoplastic resin composition according to any one of claims 1 to 3, wherein the composition further contains (F) 0.1 to 30 parts by weight of an organic phosphorus flame retardant per 100 parts by weight of the total amount of (A) and (B).

6. A flame-retardant thermoplastic resin composition according to any one of claims 1 to 3, further comprising an organic phosphorus flame retardant (F) which is a phosphoric ester represented by formula:

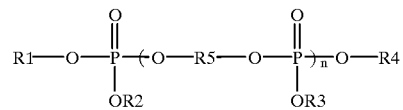

wherein $R^1$, $R^2$, $R^3$, and $R^4$ each represent a monovalent aromatic or aliphatic group; $R^5$ represents a divalent aromatic group; n represents a number of from 0 to 16; $nR^3$'s and $nR^5$'s each may be the same or different.

7. A flame-retardant thermoplastic resin composition according to any one of claims 1 to 3, wherein the composition further contains (G) 0.1 to 20 parts by weight of at least one elastic resin selected from a graft polymer and an olefin resin per 100 parts by weight of the total amount of (A) and (B).

8. A flame-retardant thermoplastic resin composition according to any one of claims 1 to 3, wherein the thermoplastic polyester resin (B) is a polyalkylene terephthalate having an alkylene terephthalate unit content of not less than 80% by weight.

9. A flame-retardant thermoplastic resin composition according to any one of claims 1 to 3, wherein the coated stabilized red phosphorus (C) is red phosphorus coated with at least one substance selected from a thermosetting resin, a metal hydroxide, and a plating metal.

* * * * *